March 5, 1957 W. R. GILBERT 2,783,987
SUPER-HEARTH CONSTRUCTION FOR HEAT TREATMENT FURNACES
Filed April 4, 1952 3 Sheets-Sheet 1

INVENTOR.
Wesley R. Gilbert
BY
Nathaniel Frucht
ATTORNEY

March 5, 1957  W. R. GILBERT  2,783,987
SUPER-HEARTH CONSTRUCTION FOR HEAT TREATMENT FURNACES
Filed April 4, 1952  3 Sheets-Sheet 2

INVENTOR.
BY Wesley R. Gilbert
Nathaniel Frucht
ATTORNEY

March 5, 1957 W. R. GILBERT 2,783,987
SUPER-HEARTH CONSTRUCTION FOR HEAT TREATMENT FURNACES
Filed April 4, 1952 3 Sheets-Sheet 3
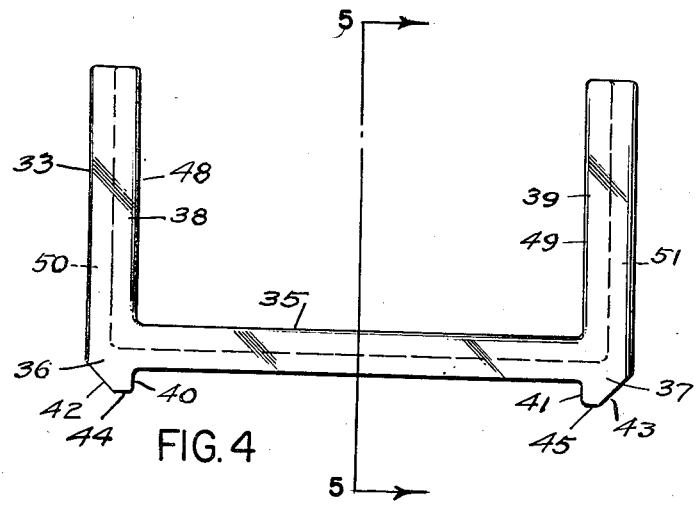
FIG. 4
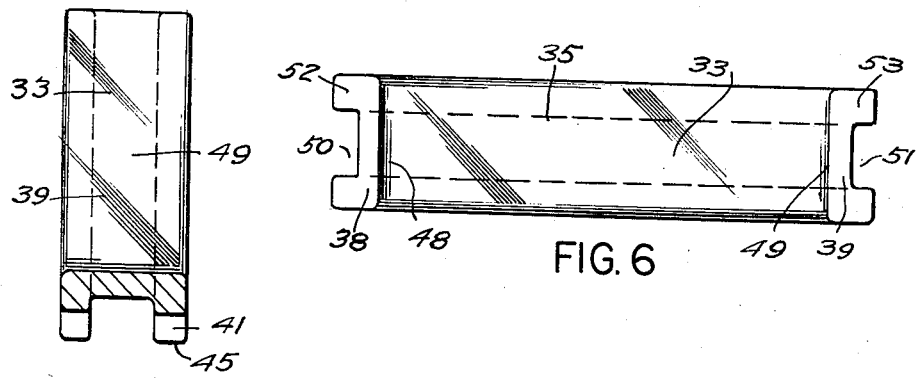
FIG. 5
FIG. 6
INVENTOR.
Wesley R. Gilbert
BY
Nathaniel Fructh
ATTORNEY United States Patent Office 2,783,987
Patented Mar. 5, 1957

2,783,987
SUPER-HEARTH CONSTRUCTION FOR HEAT TREATMENT FURNACES

Wesley R. Gilbert, Cranston, R. I., assignor to C. I. Hayes, Inc., a corporation of Rhode Island Application April 4, 1952, Serial No. 280,601

2 Claims. (Cl. 263—2)

The present invention relates to the heat treatment art, and has particular reference to a novel heat treatment furnace construction.

The principal object of the invention is to provide a muffle-type heating furnace of novel construction for heat treatment at high temperatures.

Another object of the invention is to provide a muffle-type furnace construction having means for positioning work to be heat treated in spaced relation to the muffle floor and walls.

Still another object of the invention is to provide a high temperature muffle-type furnace with means for preventing warping of the muffle walls.

A further object of the invention is to provide a muffle-type furnace having intermediate heat transfer elements between the muffle walls and the work to be heat treated.

Yet another object of the invention is to provide a muffle-type furnace having elements for preventing rapid loss of heat from the muffle walls adjacent the work being treated and resulting cold spots.

An additional object of the invention is to provide a muffle-type furnace having elements for regulating the rate of heat transfer from the muffle walls to the work being treated.

Another object of the invention is to provide a muffle-type furnace having separate aligned elevated work-supporting elements within the muffle for supporting the work.

A further object of the invention is to provide a muffle-type furnace having separate elevated elements within the muffle which have means for minimizing variations in alignment of the elements.

An additional object of the invention is to provide means in a muffle type furnace for transferring heat in stages from the muffle walls to work undergoing heat treatment.

With the above and other objects and advantageous features in view, the invention consists of novel features of construction, more fully described in the detailed description following, in conjunction with the accompanying drawings, and more specifically defined in the claims appended thereto.

In the drawings,

Fig. 4 is a front detailed view of a super-hearth element in upright position;

Fig. 5 is a section on line 5—5 of Fig. 4; and

Fig. 6 is a plan view of Fig. 4.

Figure 1:
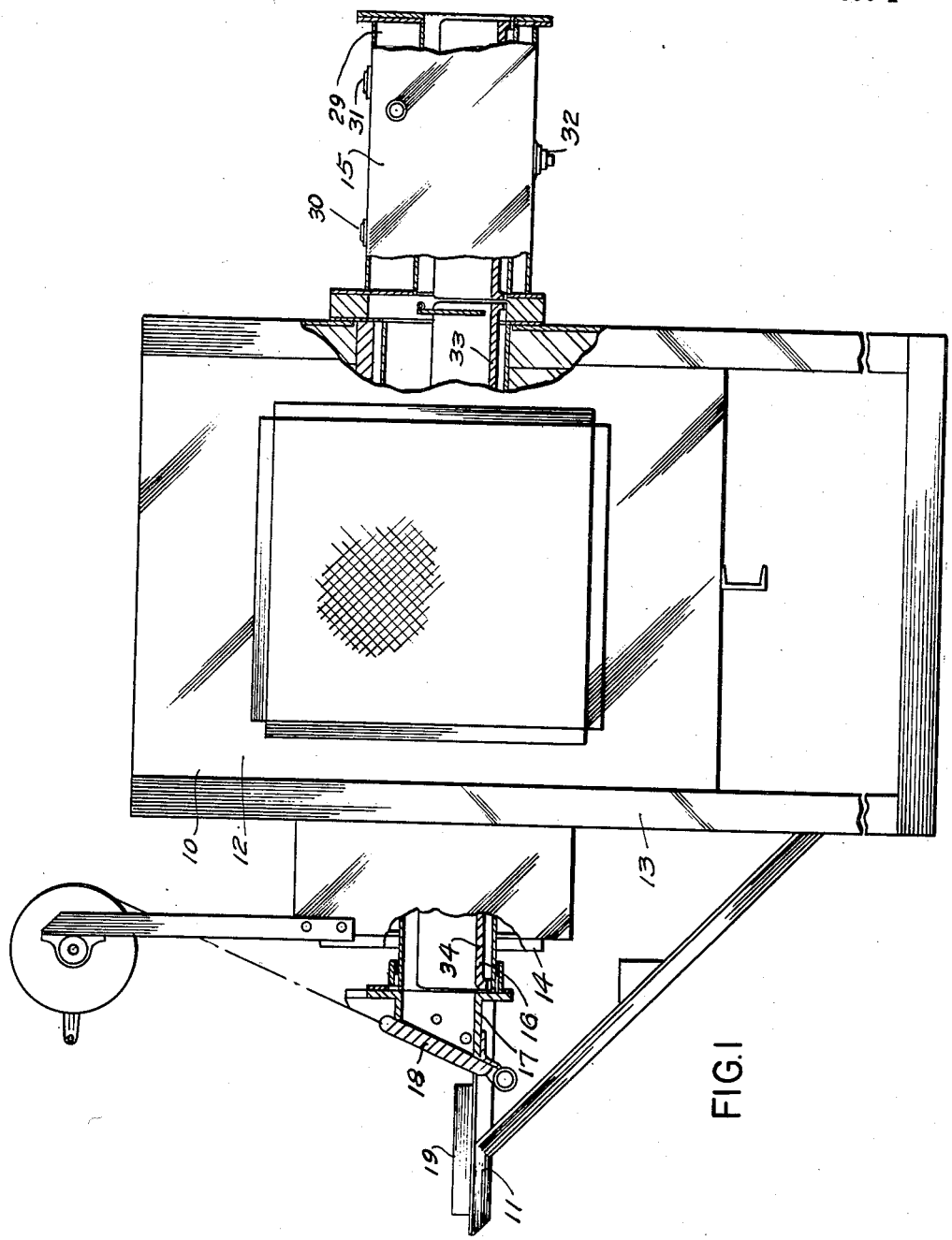
Fig. 1 is a side view of the novel muffle-type furnace construction, parts being broken away.

The heat treatment of special steels at high temperatures in a muffle-type furnace, such as the bright annealing of stainless steel articles at temperatures of approximately 2100° F. in a hydrogen atmosphere, has resulted in warping of the muffle walls due to the formation of local chilling spots when the work is introduced into the muffle and also when the heat treated work exits from the muffle to the cooling chamber. This warping is encountered with batch work treatment where the work is manually fed into the muffle, and in conveyor type furnaces where batches of work are spaced sufficiently far apart to cause excessive variations in muffle wall temperatures.

It has been found desirable to provide a novel construction for a muffle-type heating furnace whereby the work to be annealed is elevated within the muffle and away from the muffle walls and receives a substantial amount of heat from an intermediate body positioned between the muffle walls and the work. To this end, I have devised a novel furnace construction in which the muffle is provided with a number of channeled super-hearth elements aligned along the muffle floor, the super-hearth elements having their bases elevated from the muffle floor, and having upstanding sides in adjacent relation to the side walls of the muffle. The work to be heat treated is placed within the channels of the super-hearth elements so that it receives heat directly from the elements, which in turn receive heat from the muffle walls. The cold work which is introduced into the hot muffle does not therefore contact either the floor or the side walls of the muffle, and there is no sudden local chilling of the muffle and resulting warping of the muffle walls. The super-hearth elements are of heat resistant and of substantial heat retaining capacity, and transfer their heat directly to the cold work while replenishing their heat loss from the muffle walls. Although the super hearth elements may warp due to the contact of the cold work, such warping is not sufficient to affect their alignment because of the relative small sizes of the individual elements and the small contact areas of the elements with the floor and walls of the muffle.

Referring to the drawings, which illustrate a "batch-work" muffle-type heating furnace embodying the invention, the furnace 10 has a loading platform 11, a central fire brick housing 12 supported by the frame work 13, an inlet passageway housing 14, and an outlet cooling chamber 15.

The central fire brick housing has a muffle 16, centrally located and extending longitudinally therein, which connects at one end with an inlet passageway 17, located within the inlet passageway housing 14, and at the other end with the outlet cooling chamber 15. A door 18 is slidably located at the front opening of the inlet passageway 17.

Work to be heat treated is placed in work trays 19, which are initially loaded on the platform, and moved into the muffle to a position within the central heating chamber. After the heating operation is completed, the trays are moved out of the muffle and through the cooling chamber to a receiving platform, not illustrated.

Figure 2:
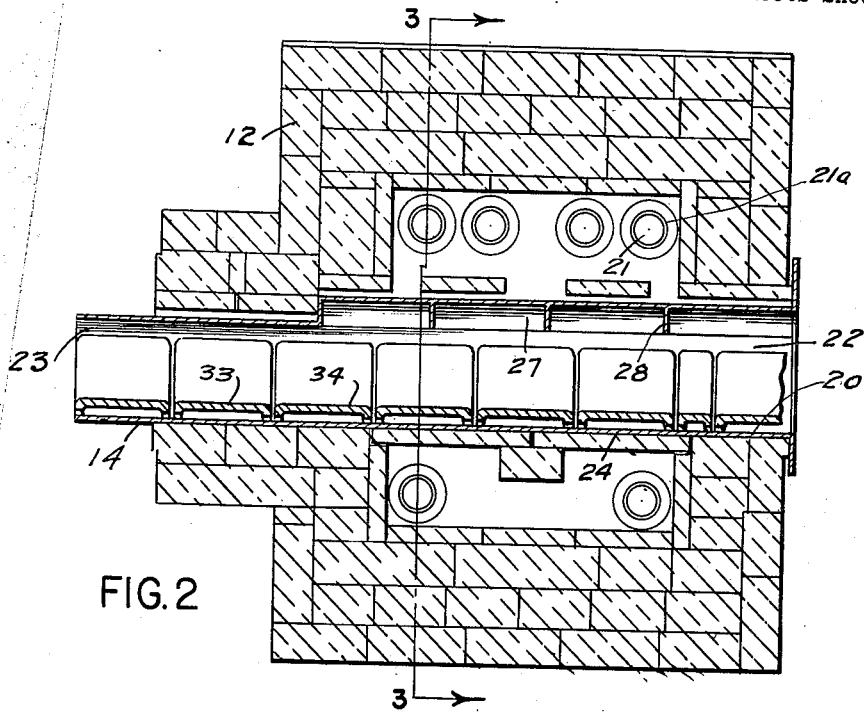
Fig. 2 is an enlarged vertical longitudinal section through the inlet and central heating chamber of Fig. 1.
Figure 3:
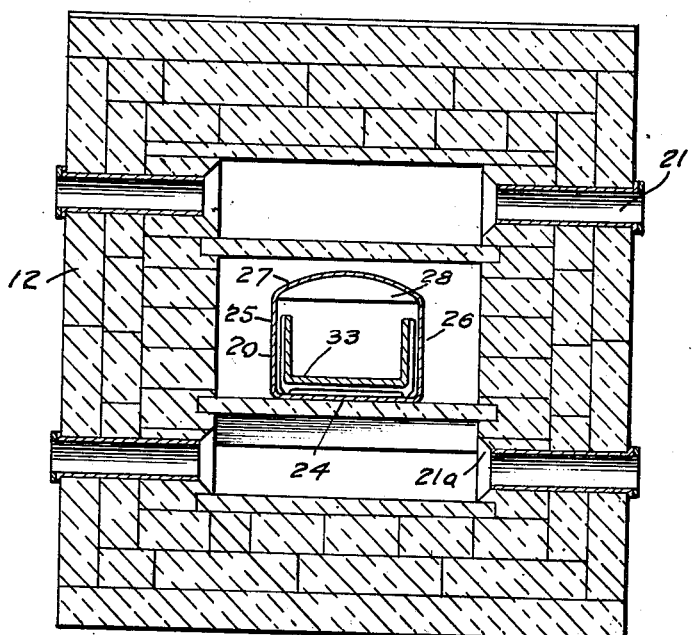
Fig. 3 is a vertical section on the line 3—3 of Fig. 1.

The walls 20 of the muffle, which may be made of either metal or ceramic, are heated by electrical heating units of standard type, not shown, seated in Alundum tubes 21 which are located above and below the muffle as shown in Figs. 2 and 3 and have bevelled inner walls 21a.

The muffle 14 includes a main heating chamber 22 and a throat 23 which are in extended alignment with each other. The chamber 22 has a greater vertical cross section than the throat and includes a flat horizontal floor 24, two perpendicular walls 25, 26, an arcuate roof 27 and spaced roof arch braces 28.

The cooling chamber 15 is in horizontal alignment with the rear end of the muffle, and has a water jacket 29 with water inlet port 30, water outlet port 31, and a drain port 32.

Super-hearth elements 33 extend along the floor length of the muffle from one end to the other in alignment to form a work conveying passage platform super-hearth 34 through the throat 23 and the main heating chamber 22 of the muffle. Additional super-hearths are positioned along the floor of the cooling chamber to extend in alignment with the work conveying channeled platform 34.

The super-hearth elements 33 are of channel form, with a flat surface 35 and depending longitudinally extending legs 36, 37, and two upstanding side walls 38, 39. The longitudinally extending legs have their inner sides 40, 41 vertical, and their outer sides 42, 43 angularly disposed so that the feet 44, 45 form a flat surface of narrow width. The upstanding walls are in alignment with the legs and have flat inner surfaces 48, 49, and outer channels 50, 51 each having two rectangular projections 52, 53.

When a tray of cold work is introduced into the hot furnace for heat treatment and in the illustrated batch-type of furnace is pushed along the channel formed by the aligned super-hearth elements until it is positioned within heating chamber, the work and work tray are both cold and begin to absorb heat immediately both from the super-hearth elements and the muffle walls. Initially, the absorption of heat from the muffle throat is very little as the tray is rapidly pushed along the channel until it finally comes to rest at the center of the central heating chamber, and therefore, the heat transfer effect from the muffle throat is not too great in a batch-type furnce. This is otherwise in a furnace using a conveyor belt which moves the work slowly along the channel, and therefore, a great amount of heat is transferred to the cold work at the muffle throat. In either case, the super-hearth elements protect the walls of the muffle from the effect of initial heat transfer.

The super-hearth elements in the muffle, shield the work from direct contact with the walls of the muffle, and come in direct contact with the muffle walls only along limited areas, at the narrow feet of the legs. Since the super-hearth elements are positioned in the muffle, they heat up as the furnace gets hot, and there is no initial heat differential between the elements and the muffle walls. As soon as cold work is placed within the muffle, however, and rest on the super-hearth, the immediate area of the super-hearth surrounding the work becomes chilled. The initial heat transfer is therefore from the super-hearth to the work by both contact and radiation, and the actual heat differential between the super-hearth and the muffle walls is not excessive. Chilling of muffle walls at the immediate area of the work is therefore limited and warping of the muffle walls is prevented. Moreover, since the contact area between the super-hearth and the muffle floor is small, the bulk being at spaced proximity to the muffle floor, chilling of the muffle is also reduced to a minimum, thereby further protecting the muffle walls from warping.

The upstanding walls of the super-hearth prevent direct transfer of heat from the side walls of the muffle to the cold work, the transfer of heat being from the upstanding walls to the cold work, loss of heat from the upstanding walls being replenished from the muffle side walls. However, due to heat already stored in the upstanding super-hearth walls, the heat loss from the muffle walls to the super-hearth walls does not chill the immediate area of the muffle walls sufficiently to cause warping.

Any warping of the individual super-hearth elements due to the chilling because of too rapid loss of heat to the cold work, and any tilting of the individual super-hearth elements is negligible because the longitudinal lengths of each super-hearth element is small, the length for a batch type furnace of standard type being six inches. As a practical matter, therefore, the channel formed by the aligned super-hearth elements is not affected, and the channel does not obstruct or interfere with the passage of the work trays.

The projections on the upstanding walls of the super-hearth elements limit contact between the elements and the walls of the muffle, should tilting of an element be sufficient to cause contact. This limited contact prevents excessive heat loss from the muffle walls to the super-hearth elements whenever the super-hearth is chilled by the cold work, and thereby prevents warping of the muffle walls.

Although I have a specific construction embodiment of my invention, it is obvious that changes in the size, shape and arrangement of the parts may be made to meet different hearth construction requirements without departing from the spirit or the scope of the invention as defined in the appended claims.

I claim:

1. In a heat treatment furnace having a central fire brick housing, a passageway at one end of the central fire brick housing and a muffle extending horizontally through the passageway housing and the central housing, the muffle having a floor, a roof and upstanding parallel side walls, a super-hearth device of extended length mounted in the muffle, said super-hearth device including a plurality of channel members, each member including a flat surface, two depending parallelly spaced legs and two upstanding parallelly spaced side walls, said legs and said side walls extending longitudinally along the sides of the flat surface, each side wall having two vertically extending and outwardly projecting elements in spaced parallel relationship and providing a channel therebetween, said projecting elements depending below said flat surface and contiguous to the channel member legs, the flat surfaces of said members being horizontally aligned in longitudinally extended fixed abutting relationship whereby a flat extended platform above and in spaced relation with the muffle floor is provided, and the upstanding parallel side walls of said members being vertically aligned in extended fixed abutting relationship whereby extended parallel side walls in close spaced proximity to the muffle side walls are provided, the depending legs and the side wall projections of the channel members limiting contact of the channel members with the muffle walls.

2. In a heat treatment furnace having a central fire brick housing, a passageway at one end of the central fire brick housing and a muffle extending horizontally through the passageway housing and the central housing, the muffle having a floor, a roof and upstanding parallel side walls, a super-hearth device of extended length mounted in the muffle, said super-hearth device including a plurality of channel members, each member including a flat surface, two depending parallelly spaced legs and two upstanding parallelly spaced side walls, said legs and said side walls extending longitudinally along the sides of the flat surface, each side wall having two vertically extending and outwardly projecting elements in spaced parallel relationship and providing a channel therebetween, said projecting elements depending below said flat surface and contiguous to the channel member legs, said depending projecting portions tapering inwardly towards the channel member legs, the flat surfaces of said members being horizontally aligned in longitudinally extended fixed abutting relationship whereby a flat extending platform above and in spaced relation with the muffle floor is provided, and the upstanding parallel side walls of said members being vertically aligned in extended fixed abutting relationship whereby extended parallel side walls in close spaced proximity to the muffle side walls are provided, the depending legs and the side wall projections of the channel members limiting contact of the channel members with the muffle walls.

References Cited in the file of this patent

UNITED STATES PATENTS

| | | |
|---|---|---|
| 1,613,054 | Prouty et al. | Jan. 4, 1927 |
| 1,671,794 | Summey | May 29, 1928 |
| 1,867,772 | Smalley | July 19, 1932 |
| 2,149,883 | De Coriolis | Mar. 7, 1939 |
| 2,192,743 | Howe | Mar. 5, 1940 |
| 2,277,595 | Levy et al. | Mar. 24, 1942 |

OTHER REFERENCES

Page 240 of Trinks' "Industrial Furnaces," vol. II, 2nd edition. Published 1942 by John Wiley and Sons Inc., New York, N. Y.